PENTACONTA SEMI-ELECTRONIC SYSTEM

Filed Nov. 27, 1962 4 Sheets-Sheet 1

Inventor
H. BENMUSSA
P.R.L. MARTY
S. KOBUS
By [signature]
Attorney

Inventor
H. BENMUSSA
P.R.L. MARTY
S. KOBUS
By [signature]
Attorney

Inventor
H. BENMUSSA
P.R.L. MARTY
S. KOBUS
By [signature]
Attorney

Inventor
H. BENMUSSA
P.R.L. MARTY
S. KOBUS
By [signature]
Attorney

United States Patent Office 3,270,139

Patented August 30, 1966

3,270,139

PENTACONTA SEMI-ELECTRONIC SYSTEM

Henri Benmussa, Meudon, and Pierre René Louis Marty and Stanislas Kobus, Paris, France, assignors to International Standard Electric Corporation, New York, N.Y., a corporation of Delaware Filed Nov. 27, 1962, Ser. No. 240,269
Claims priority, application France, Nov. 30, 1961, 880,491, Patent 81,352
9 Claims. (Cl. 179—18)

The present addition relates to a selection system for electrical circuits or equipment applicable in particular to the automatic telephone exchanges.

In the system, a local call, that is to say a call established between two subscribers or equipment directly connected to the same exchange, brings into play a calling subscriber, a first selection chain, a local junctor or feed-junctor, a second selection chain and a called subscriber.

Each of the two selection chains is realized by means of crossbar multiswitches that have already been tested in existing exchanges and which afford excellent quality of transmission, being economical as well. To establish a connection, one single marker, built with electronic components and operating in a practically instantaneous manner, begins to mark the various elements liable to be connected at both ends of the selection chain. When the first selection chain is concerned the calling subscriber is marked on one side, and all available feed-junctors on the other. When the second chain is concerned, the called subscriber's line(s) is/are marked on one side, and the feed-junctor connected to the calling subscriber on the other side. To determine in each of the two selection chains an available routing path, and one only between both ends thus marked, among all available routing paths a by-path network or "pilot network" is used which configuration is identical to that of a switching network. A signal is sent from the units marked at one end towards the circuits marked at the other end, through all avaliable routing paths. In the first selection stage, the path sections are next progressively blocked without hampering the signal until one only is left. The selection is carried out similarly in all stages. To accelerate the operation it is conducted in a logarithmic way: in each stage a part of the path-sections is blocked; for instance half of them, then a part of the remaining path-sections, and so on. Arrangements are provided that, if the signal is no longer received at the other end of the pilot network, the precedingly blocked path-sections are put once more into service. The identity of the chosen path-sections is then communicated to the switching network, so as to obtain a simultaneous setting into position of the selectors of all the stages. Special arrangements which bring into play the properties of the transistors, make it possible to obtain the fast energization of the connecting and the selecting magnets without having to employ large current intensities. The connecting magnets hold then by mere remanence and enable the realization of important savings in current consumption.

In order to release the connecting magnets, it is essential to send them a demagnetizing current, and therefore their identity must be established. In the first version of the present system, the identification operation is effected by generating an impulse which will spread through the entire selection chain, along the third wire. Identifiers of a well-known type are connected onto various points of this wire.

The local junctor or feeder, inserted between the two selection chains, has, as main functions; the sending of signal tones, the supply of current subscribers' stations and the holding in seized condition of the two chains. Being of a simplified type, it comprises only the line wires, the feeding relays and the relays which emit the different tones as well as the ringing current. The other functions, usually accomplished by the feeder are distributed into common equipment units realized by means of electronic components. A certain number of memories, made up of ferrite cores, are assigned to each feeder. A logic circuit common to a group of feeder-junctors takes notice, at each operating stage, of the items of information given out by these memories as well as by the contacts of the various relays. It deduces all useful conclusions, performs the necessary operations and then brings the memories up to date. The various feeder-junctors being scanned in cyclical manner, a same logic circuit will operate in succession for each one of them according to the so-called "time-division multiplex method."

When the logic circuit, after reading the memories of a feeder junctor must send out an order onto a relay of the said feeder; it cannot, of course, keep waiting until this order is registered, since it has but a few tens of microseconds to accomplish its mission. On the other hand a telephone relay of the currently used type requires ten to twenty milliseconds to energize. There is provided, therefore, between the logic circuit and the feeder junctor's relays, an intermediary unit or "junctor driver," which receives the orders from the logic circuit and stores them in memory until such time as they are registered upon the feeder junctor's relays. Since the said junctor driver is common to a group of feeder-junctors, this process implies a waiting period, because total busy condition of the junctor drivers might exist when the logic circuit has an order to be transmitted. However, in the case of the feeder junctors, the orders most often consist in the sending of tones or similar operations. The waiting period, which does not exceed a fraction of a second, does not cause appreciable inconvenience.

A register is temporarily associated with the feeder junctor in order to receive the numbers dialled by the subscriber, and to request the marking on both ends of the selection chain, at the called subscriber's side, through the medium of adequate translating devices. It includes essentially a certain number of memories made up of ferrite cores. As in the case of the feeder junctors, a logic circuit, common to a group of registers, operates successively for each one of them according to the time division multiplex method. The association of a feeder junctor with a register is characterized by the writing down of the feeder junctor number into the memories of the register. For interchanging items of information between a feeder junctor and the associated register, the following process is adopted. At the instant the register is being scanned, it orients the feeder junctor's scanned onto the associated feeder junctor, this being possible since it knows its number. The register and the feeder junctor are scanned at the same moment and the interchange of signals is possible.

Transfer memories enable the interchanging of information between junctors, registers and markers. Their presence is necessary because, when an item of information is available in the emitting unit, it cannot be utilized as long as the receiving unit is not scanned; it is therefore necessary to store it in a memory if it is not intended to keep the emitting unit waiting.

An outgoing call requires a circuit between a local calling subscriber, a selection chain and an outgoing junctor. The function of the latter consists in interchanging with the distant exchange the various signals necessary for routing the call (seizure, invitation to transmit, selective indication, subscriber free or busy, reply from called party, replacing of handset by called party, release). Like the feeder junctor it is of a simplified type and only comprises the line wires, the caller's feeding relays and the relays which transmit and receive the signals, as much from subscriber's side as from circuit side. Some memories are assigned to this circuit outgoing junctor, and all active functions are performed by a logic circuit. The latter acts upon the outgoing junctors via a junctor driver; nevertheless, when the period of waiting is excessive (transmission of calibrated impulses, for instance), the logic circuit acts directly upon the junctor, and necessitates in each one of them a device for storing the order during the time-period which separates two successive scanning operations.

An incoming call requires a circuit between an incoming junctor, a selection chain and a local called subscriber. The explanations given already in respect to the outgoing junctor also apply in the case of the incoming junctor.

Finally, a transit call requires a circuit between an incoming junctor, a first selection chain, a transit junctor, a second selection chain and a circuit outgoing junctor.

The selection chain and the marker have been disclosed in a United States patent application Serial No. 177,551 filed March 5, 1962, now Patent No. 3,226,486, assigned to the same assignee as the present invention and corresponding to French patent No. 1,290,332 filed on March 3, 1961 and relating to a "Selection System for circuits or electrical equipment." The operating process of the feeder junctor and of this register, in the case of a local call, is disclosed in the French patent. The case of outgoing, incoming and transit calls was disclosed in U.S. Patent application No. 240,606 filed on November 28, 1962 and now abandoned.

The present invention relates to a variant for realizing the feeder junctors and registers, in the case of local calls. It brings a certain number of improvements bearing upon the following points: determining the selectors used in a selection chain, processing of special category subscribers, simplifying the junctor driver and carrying over some of its functions onto the transfer memories.

According to a feature of the invention, when the marker has determined the various elements of a selection chain liable to link both ends marked, it writes, on the junctor memories, items of information which correspond to these elements, the said items of information being read and used subsequently at releasing time, this arrangement make it possible to do away with the third wire and to simplify the multiswitch structure.

According to another feature of the invention, in order to perform writing and reading operations on the junctor memories, the marker first orients the scanner onto the required junctor by means of an adequate code. Then, in order to sensitize these memories, special time positions are assigned to the marker to make the latter have access to the junctor memories so as to avoid any interference either with the junctor logic circuit, or, with the register logic circuit.

According to another feature of the invention, the junctor memories are accessible to the junctor logic circuit, to the register logic circuit and to the marker. Distinct time positions are provided for those three cases of operating, the said logic circuits and the said marker, after having performed reading and writing operations on the junctor memories at the time-instants assigned to them, can effect the logic operations outside these time-instants, and this enables an appreciable gain of time.

According to another feature of the invention, the marker directly starts the energizing of the subscriber's cutting relay, the latter will hold then by mere remanence and will de-energize at releasing time, by means of a demagnetizing current originating from the said marker; this arrangement making it possible in combination with the foregoing, to do away with the third wire.

Another feature of the invention is the writing, permanently or semi-permanently, into the memories of each local junctor or feeder, the primary selector number associated with called end of the said junctor. In this way, when the marker has to effect the selection of a called line, it may be able to read this number and start the marking of the upline end of the selection chain, this arrangement would enable in combination with the foregoing, to do away with the third wire of this primary selector, used previously for its identification.

Another feature of the invention is a translator intended for determining subscribers' special categories comprising essentially, for each of the said subscribers, two sets of memories—one for displaying the subscriber's number, and the other his category. These memories are read out in succession and the subscribers' numbers are sent onto a comparator which also receives the subscriber's number for whom it is intended to determine the category. When the two indications received by the comparator are identical, the latter unblocks a gate, and the indication read out is then transmitted through this gate and displayed on an appropriate device.

According to another feature of the invention, the first set of memories, assigned to each subscriber, displays on one hand the subscriber's directory-number, and on the other hand his equipment number (terminal selectors frame, the subscriber's rank upon the banks of these selectors). This makes possible, during the scanning operation, the performance of comparisons either on the directory numbers or on the equipment numbers, according to each case. The second method is used when the marker has just found a calling subscriber while knowing only the latter's equipment number.

According to another feature of the invention, when comparisons are undertaken, bearing upon the subscribers' directory numbers a scanner is put into service which gives access to a determined fraction of the special category subscribers (subscribers of a same thousand group, for instance), and this will enable a reduction in the total duration of the scanning operation.

According to another feature of the invention when the marker, immediately after having effected the finding of the calling subscriber, transmits to the register an item of information which indicates that this is a special category subscriber, the register would call upon the translator to determine this category, and would take notice of this category in order to give to the call the required further action.

According to another feature of the invention, when the hunting for calling line is terminated, and the register has received the called subscriber's telephone number, it systematically resorts to the special subscribers-translator in order to detect, a category indication which would necessitate a particular routing of the call. In case the called subscriber's number is not included inside the translator, the scanning operation remains without any result and the register deduces that this must be an ordinary category liable to be determined by the marker after selection of the called subscriber.

In the patent application Serial No. 177,551 referred to above, the junctor driver, besides its function of intermediary between the junctor logic circuit and the junctor relays, was performing a certain number of functions of transfer memories for the interchanging of information between junctors, registers and markers. Furthermore, it was used as intermediary between the register logic circuit and the junctor relays.

According to another feature of the invention transfer memories are used, on one hand, for the interchanging of information between junctors, registers, markers, and, on the other hand, a junctor driver is used as intermediary between the junctor logic circuit and the electromechanical part of the junctor. This enables simplification of an embodiment of the junctor driver by relieving it of its transfer memory functions.

According to another feature of the invention, the junctor driver is only accessible to the junctor logic circuit, and, when the register has to transmit an order to the electromechanical part of the junctor (sending of the dialling tone or of the ringing current), it writes this order on the junctor memories, the order being then re-transmitted by the junctor logic circuit onto the junctor driver, and from there onto the electromechanical part of the junctor. This arrangement makes it possible to simplify the access circuits of the junctor driver.

Various further features will be disclosed from the following description which is given by way of non-limiting example, and with reference to the accompanying drawings which represent:

*General arrangement of the equipment.*—In the figures, the electronic gates are represented by circles of small dimensions containing each a digit; digit 1 representing the gates "OR" and digit 2 the gates "AND." The ferrite cores used as magnetic memories are represented by small oblique strokes; the rectangles DCJ placed under said cores correspond to the reading and writing equipment. The scanners are schematically represented by rectangles associated with rotary switching equipment; the rectangle corresponds to the code distributor, that is to say to the system of *n* bistable circuits or similar devices which enable to obtain successively $2^n$ combination in binary form. The rotary switching equipment corresponds to the decoding matrix which enables to obtain from each combination the applying of an electrical characteristic on one wire and one only.

Figure 1:
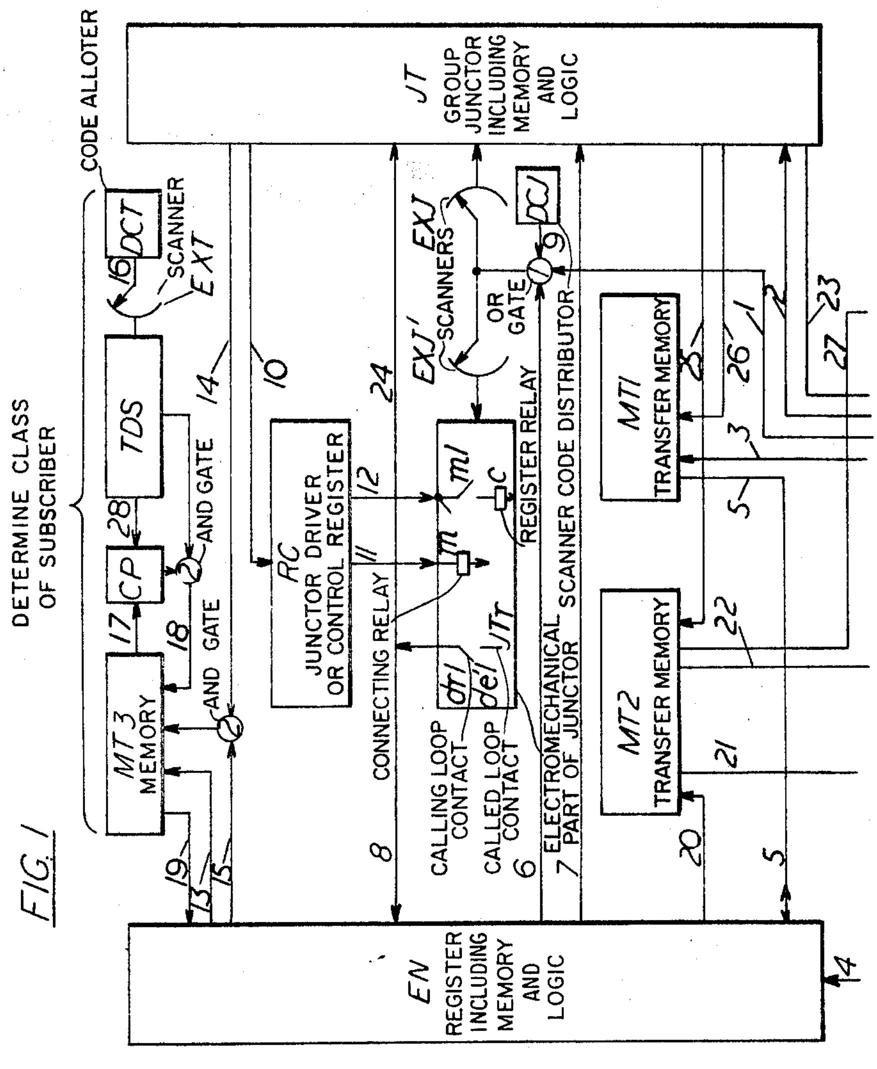
FIGURES 1 and 2 show a block diagram of the general operating process of the system.
Figure 2:
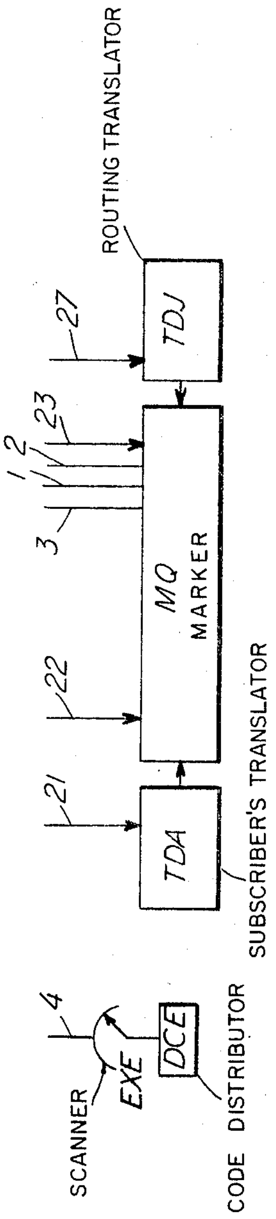
Figure 3:
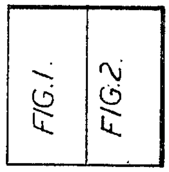
FIGURE 3 shows the arrangement of FIGURES 1 and 2.

In FIGURES 1 and 2 arranged as indicated in FIGURE 3, are represented the equipment mentioned in the analysis shown at the beginning of the preamble. MQ represents a marker which hunts for an available routing path to link the two ends of a selection chain it has marked. The selection chain itself constituted by multiswitches has not been represented in order not to complicate the diagram. Two translators are associated with marker MQ, the terminal translator or subscriber's translator TDA receives the called subscriber's code and locates said called subscriber's position in the last selection stage banks. It provides total independance between directory numbers and the subscribers' positions in the exchange. The routing translator TDJ receives, in the case of an outgoing call, the dialled office code in order to deduce the corresponding circuit group of lines.

Rectangle JT designates on the one hand all the magnetic memories assigned to the different group junctors, and on the other hand the logic circuit which successively acts for the account of all junctors. The unit JT*r* corresponds to the electomechanical part of each junctor. Contact *dr*1 is provided for giving information about the calling subscriber's line; it is closed or open according as the line is looped or opened. Contact *dé*1 fulfils a similar function for the called subscriber's line. Relays such as *c* register and carry out the orders coming from the junctor logic circuit, through intermediary of junctor driver RC.

Lastly, relay *m* is only a connecting relay common to a subgroup of junctors. As an example, a group has 1,024 junctors and a subgroup 8 junctors. Scanners EXJ and EXJ′ successively designate the junctors which must operate associated with the logic circuit. EXJ scans the junctor cores, thus enabling reading and writing operations on these cores. EXJ′ scans the signalling contacts *dr*1, *dé*1 of the subscribers' lines. Scanners EXJ and EXJ′ scan sychronously; in each position they give access to a determined junctor, the various cores and contacts of said junctor being scanned simultaneously.

The scanners EXJ and EXJ′ present a certain number of particularities with regard to patent application No. 177,551. They can receive orders from code distributor DCJ, from register EN and from marker MQ. Code distributor DCJ successively sends through connection 9 and one gate "OR," the codes of the different group junctors; it enables the junctor logic circuit to act successively for the account of all junctors. Scanners EXJ and EXJ′ can also receive a junctor code coming from register EN, through connection 6 and gate "OR," this process being utilized when the register logic circuit must act for the account of a determined junctor. Lastly, marker MQ can also send a code to scanners EXJ and EXJ′ through connection 1 and gate "OR" when it must act with a determined junctor.

Figure 5:
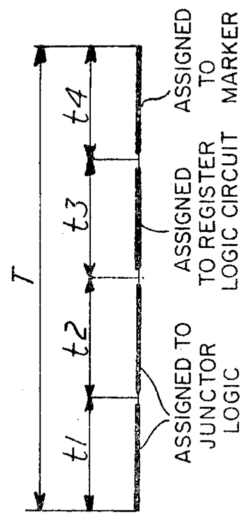
FIGURE 5 is a diagram of the time periods provided for junctor memory scanning.

FIGURE 5 shows a time-period diagram which enables to obtain this operation. Period T includes four successive time positions *t*1, *t*2, *t*3 and *t*4. Time-periods *t*1 and *t*2 are assigned to the junctor logic circuit, said circuit having access to the cores and contacts of junctor relays only during these times. Similarly time *t*3 is assigned to the register logic circuit and is assigned to the marker. For traffic reasons the junctor logic circuit is given two time positions while the register and marker are given only one. In this way, there is no interference between the different logic circuits of the junctor, register and marker. Practically the duration of each time position is about 30 microseconds. This lapse of time is much longer than the time necessary for carrying out a reading or writing process on a junctor's cores, but it takes into account the features of the scanning circuits of the subscriber's line signalling contacts, the latter being sometimes rather far from the logic circuits and marker.

The register logic circuit has access to junctors only during time-period *t*3, but nothing prevents it after having carried out a reading or writing process, from proceeding to logic operations during time-periods *t*4, *t*1 and *t*2. The same fact concerns also the junctor logic circuit and the marker. Such an arrangement makes it possible to gain appreciable time.

Rectangle EN designates, on the one hand the memories of the various registers of a group, and on the other hand the logic circuit which successively acts for each of them. These registers are scanned by scanner EXE; the latter has the same function as regards registers as scanners EXJ and EXJ′ towards junctors; however scanner EXE receives orders from the only code distributor DCE, which successively sends codes of all group registers. As above-explained, the exchange registers are divided into groups, whereas they formed one single group in patent application No. 177,551. A group register cannot work with any junctor, but only with a junctor of the corresponding group.

MT1 and MT2 represent the transfer-memories which enable information exchange between junctors, registers and markers. In patent application No. 177,551, the control register has some functions of a transfer memory. In the considered patent application "JUNCTOR DRIVER" RC does not act as a transfer memory but as an intermediary between the junctor logic circuit and the electromechanical part JT*r* of each junctor. All the transfer memory functions are divided between MT1 and MT2.

The purpose of equipment MT3, CP, TDS, EXT and DCT, placed in the upper part of the diagram is to determine certain particular special classes of subscribers.

*General operation, preselection.*—Now will be described the general operation of the system and first of all the connecting process of a calling subscriber to an available local junctor or feed-junctor which itself is connected to an available register. When a subscriber is calling, marker MQ is immediately warned; it marks, on the one hand, said subscriber at one end of the selection chain and, on the other hand, all available local junctors or feed-junctors at the other end of the chain. The marker then starts seeking an available routing path for connecting the calling subscriber to one of these feed-junctors, then it controls simultaneously the connection in all the selectors which correspond to said path. The various operations relating to the finding cut of an available routing path and the connection have been described in detail in the patent application mentioned at the beginning of the preamble. The marker thus knows the equipment number of the chosen junctor, that is to say the number of its frame and its location in said frame. It deduces, by translation, the scanning number of this junctor, that is to say, its group and its row, on scanner banks EXJ and EXJ'. It is obvious that the relation between the junctor's equipment number and its scanning number will not necessarily be a simple one of a good flexibility in realization of the invention and specially in the exchange extension is sought.

At time *t*4, which corresponds to the accessibility of the marker to the junctors, the marker sends through connection 1 and one gate "OR" a code corresponding to the scanning number of the seized junctor; scanner EXJ then orients said junctor. Through connection 2, marker MQ sends to the junctor's memories all information concerning the units used in the selection chains. Each item of information can be transmitted, for instance, in the shape of a well known code "three out of six" which makes possible the detection of errors, a code being erroneous if it comprises less or more than three elements. These various items of indication will be utilized at the release. Since the control magnets of the various selectors hold by mere remanence, it is necessary, for their release to send a de-magnetizing current, thereby their identity must be known.

In the main patent application No. 177,551, information enabling the system to find out the various units utilized in the selection chain were not stored in memories. When information was needed at the release, an identifying process took place; an impulse was sent, from the junctor to the third wire and propagated up to the other end of the selection chain. By means of well-known identification devices, the desired item of information was shown in each stage. By storing information in memories, when they are available in the marker, the number of core matrices necessary for the accomplishment of junctors is thereby increased, but this fact is not important since these matrices are not bulky and not expensive. On the contrary one inestimable advantage is gained by simply cancelling the third wire; thus it is possible while retaining the same multiselector frame to increase to a great extent the number of selectors placed in each of them. As an example this number can increase from 22 up to 36. The electromechanical part being far and away the more bulky, it is clearly understood that this arrangement enables important space saving or, what amounts to the same thing, an increase in the number of subscribers served for an exchange having the same dimensions.

As the selectors comprise only two wires, the subscriber's cut-off relay cannot be energized by means of the third wire, as in the patent application No. 177,551 mentioned in the preamble. This relay is thus energized from the marker which has all necessary information, that is to say the number of the terminal selector frame and the subscriber's row on the selector banks. Then the marker releases and the cut-off relay holds by mere remanence as a multiselector control magnet. When the selection chain releases, the marker de-energizes said cut-off relay by sending to it a degaussing current of appropiate direction.

While transmitting to the junctor information enabling it to locate the units utilized in the selection chain, the marker sends to memory MT1 through connection 3, the junctor's scanning number, the calling line class and the call order of an available register. Then it releases. In the figure only one transfer memory MT1 has been represented; but, of course, several are provided if the traffic is high; in this case, circuits of well-known type are used permitting a choice of one memory from among the various available ones.

When a free register is scanned by EXE, it studies the MT1 memory's contents through connection 5 and finds the call-order. The number of the seized junctor and the calling subscriber's class are then routed from memory MT1 to the register, through said connection. The register is seized and the memory is released.

When the seized register is scanned again by EXE, it sends the junctor code to scanner EXJ; through connection 6 and gate "OR." Thereby it is enabled to operate for the account of said junctor and through connection 7, it transmits to the junctor the order for sending the operating signal towards the calling subscriber. This order is recorded on appropriate ones of the junctor's memories. Thus the connection of a junctor to a register is obtained, as in the main patent application, by the record of the junctor's number on the register memories. To be connected with said junctor, the register has only to send the corresponding code through connection 6, the two scanners EXJ and EXJ' being then directed on the required junctor. Through medium of connection 7, the register can proceed to the reading and writing process on the junctor's cores. Through medium of connection 8 it can check the condition of contact *dr*1 and *de*1.

When distributor DCJ sends the junctor's code to scanner EXJ, the junctor logic circuit proceeds to the reading of the order for sending the operating signal on the junctor's cores; it re-transmits this order and the junctor's number to the junctor driver or control register RC, through connection 10.

Control register RC energizes through wire 11, the connection relay *m* common to the junctor subgroup. Then it energizes, through wire 12, the relay *c* of considered junctor, provided for receiving the order for sending the operation signal. Control register RC remains operating during all the lapse of time necessary for relay *c* to energize, then it releases. Then this relay holds by all appropriate means and causes the sending of the operation signal towards the calling subscriber.

*Called subscriber selection.*—When the calling subscriber dials his correspondent's number, contact *dr*1 pulses. By all appropriate means relay *c* is de-energized in order to stop the sending of the operation signal. The condition of contact *dr*1 is tested by the register at each cycle of scanner EXE. The duration of a dialling impulse is about 66 milliseconds, whereas that of scanner EXE cycle is only 8 milliseconds; therefore contact *dr*1 must be scanned during several successive cycles of scanner EXE and the results must be appropriately interpreted. For example if the number of consecutive openings is comprised between 3 and 12, it is deduced that a dialling impulse is concerned. If this number is smaller than 3, it is probably an accidental cut of the line; if it is bigger than 12, it means that the called subscriber has replaced his handset. The interpretation of the closing is carried out similarly. This process has been described in detail in patent application No. 177,551. The various dialled digits are thus recorded in the register memories.

Now it will be assumed that the called subscriber is directly connected to the considered exchange. The register, having detected that it is a local call, seizes an available transfer memory and transmits to it through connection 20 three different items of information, that is to say the junctor's number, an order for selecting the called line and the code portion enabling the selection in the Exchange (generally, the numerical part constituted by the four last digits). These various items of information can be transmitted in series, that is to say successively. Thus is simplified the accomplishment of the register logic circuit. As indicated for transfer memory MT1, several memories MT2 are provided if necessary for the traffic.

Memory MT2 retransmits to marker MQ, through connection 22, the junctor's number and the order for selecting the called line. It retransmits to the subscriber's translator TDA, through connection 21, the code part necessary for the selection. Then it releases.

The translator TDA transmits to the marker all necessary information concerning the location of the called subscriber in the exchange, which enables to mark said subscriber at one end of the selection chain. At the same time the marker directs scanner EXJ onto the seized junctor, which enables it to read thru intermediary of connection 23, the number of the primary selector associated with the called subscriber's side of the junctor. Of course, this implies that the called subscriber's side primary selector's number has previously been recorded on the memories of each junctor. The marker is then ready to carry out the required marking at the otner end of the selection chain.

The marker then proceeds to find an available routing path between the two ends thus marked, then orders the simultaneous connection in all stages. It transmits to memory MT1, through connection 3, the junctor's number as well as an "end of selection" order. At the same time it directs scanner EXJ onto the considered junctor (connection 1) and transmits to this junctor through connection 2, all information needed to find the various units utilized in the selection chain on the called subscriber's side. These indications are stored in the junctor in order to be used at the release. Then, the marker releases.

When the seized resistor is scanned again, it analyses the contents of memory MT1 and finds the junctor's number that it has already stored there and which has been kept from the beginning of the operation. It then proceeds to read the "end of the selection" order and the memory MT1 releases.

At the next scanning operation by EXE, the register orients the scanner EXJ onto the junctor considered here (wire 6) and transmits to it the order to send the ringing current to the called subscriber; then it releases.

When the scanner EXJ receives from the code allotter DCJ the number of the junctor considered here, the junctor logic circuit starts to readout the order for sending ringing current as written in the junctor memories. This order is transmitted to the junctor driver RC through the link 10. In its turn, the junctor driver re-transmits the order to junctor relay *c* provided for this purpose, then it releases. The calling current is sent to the called subscriber by means of relay *c*.

When the called subscriber answers, the contact *dé*1 closes. As soon as the scanner EXJ' orients to the junctor JT*r*, considered here, under control of the code alloter DCJ, the junctor logic circuit tests the condition of the contact *dé*1 and starts performing all the useful operations (e.g. releasing relay *c* which has registered the order of ringing current-sending). In order to prevent any untimely action due to noise disturbances, it is possible, for instance, to take into considertion the called subscriber's replacing of handset only when the contact *dé*1 has been found closed during two or more successive scannings.

During the entire duration of the call, the junctor logic circuit examines the condtions of the contacts *dr*1, *dé*1 at every scanning operation; it is therefore warned when this call ends. It then writes a release order in the junctor memories.

*Release.*—When the scanner EXJ stops again opposite the junctor considered here, under control of the code allotter or scanner DCJ, the junctor logic circuit begins reading out the release order written in the junctor memories. It then transmits to the memory MT2, through the connection 25, the junctor number as well as the release order.

The transfer memory MT2 communicates to the marker, through connection 22, the junctor number as well as the release order, then it releases. The marker MQ orients the scanner EXJ onto the junctor considered here and receives from this junctor, through connection 23, all the indications which are necessary to determine the various elements used in the selection chain from caller's end. The marker then orders the release of this chain by sending a de-magnetizing current onto the connecting magnets of the seized selectors and onto the caller's cutting relays. This done, it orients once more the scanner EXJ onto the junctor in order to inform the latter that the release of the selection chain from the caller's end has been effected.

The release of the selection chain from the called subscriber's end is effected according to the same process.

When the scanner EXJ orients once more onto the junctor considered here, under control of the code allotter DCJ, the junctor logic circuit takes notice, by means of analysis of the memories, that the two selection chains, caller side and called side, have been released. It then releases the junctor, that is to say brings back all its memories to their initial condition. In case the called subscriber is busy, the marker MQ sends to the transfer memory MT1, through connection 3, an order "end of selection with called subscriber's busy condition signal." This order is re-transmitted to the register, then to the junctor, in the same way, as the order of simple end of selection. By means of the junctor driver RC, a relay *c*, inside the junctor JT*r*, is energized, and this relay finally sends out the busy tone to the calling subscriber. The release is effected according to a process already described.

*Special category subscriber.*—According to a well-known process, it is possible to make appear a subscriber's category indication, from the energizing circuit of his cutting relay by means of an adequate coding device. Such a device has been described in detail in the previously referenced patent application No. 177,551. Unfortunately, this device only enables each subscriber to participate in a small series in the case where it is required to keep a reasonable cost price for the subscriber's junctor. Furthermore, any change of category necessitates the displacing of one or several movable connections and cannot be obtained automatically, neither by an operator nor by the subscriber.

According to the invention, this method is only used for the usual categories (ordinary subscriber restricted service subscriber, etc.), or for indicating that the subscriber belongs to a special category; in the latter case, it is necessary to push on the analysis further by making use of a special subscriber's translator.

First will be explained the case wherein it is the caller who belongs to a special category. When the register receives from the marker the indication corresponding to the special category, it seizes the memory MT3 through connection 13. It then orients the scanner EXJ onto the seized junctor (connection 6) and transmits to this junctor an order for reading the caller's telephone number (connection 7). In fact, when there has been written on the junctor-memories the indications which permit the finding out of the various elements used in the selection chain, it is not the caller's directory number that is made to appear, but his equipment (or unit) number (terminal selector frame number or subscriber's rank upon the banks of the selector). When the preselection takes place, the marker does not, in fact, have any simple means of knowing the caller's telephone number, unless it effects a translation. Nevertheless, for sake of this explanation, it will be assumed that the subscriber's directory number is written in the junctor memories. This number is therefore read by the junctor logic circuit and sent onto the memory MT3 through the connection 14 and an "AND" gate rendered conducting by the register logic circuit (connection 15).

Figure 4:
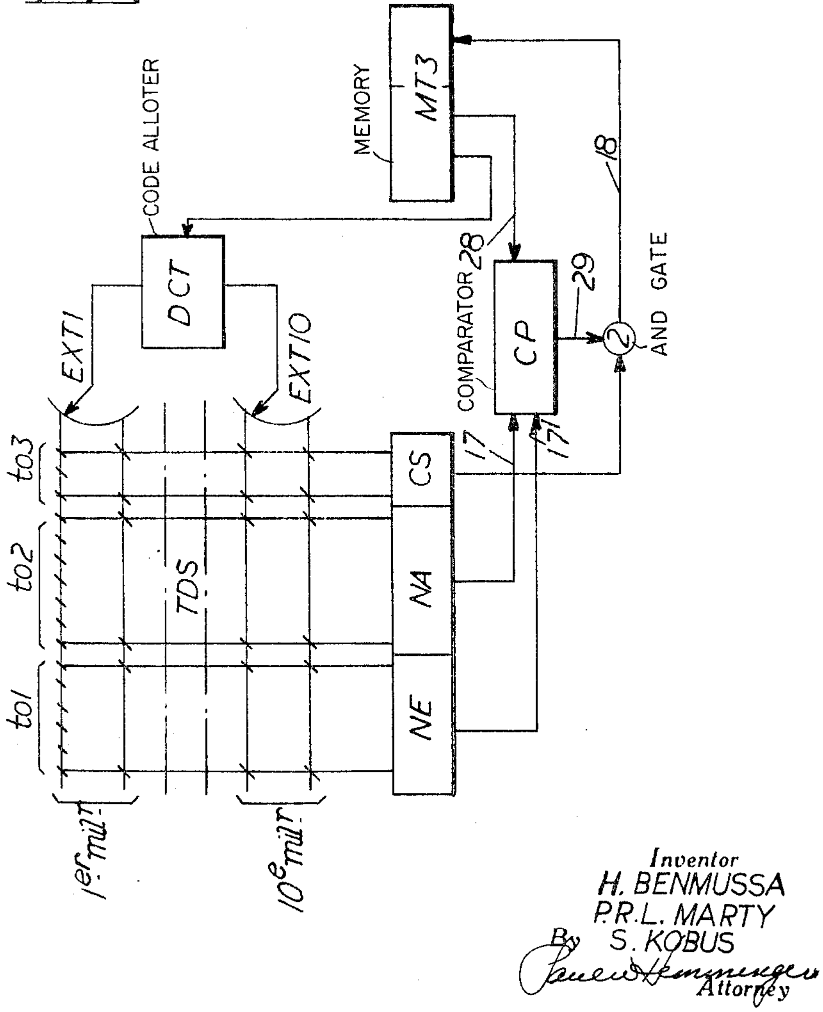
FIGURE 4 is a simplified diagram of the translator, which is used to determine certain special classes of subscribers.

The special subscriber's translator TDS is more explicitly illustrated in FIGURE 4. It is essentially made up of a matrix comprising several rows of ferrite cores. One row of cores is assigned to every subscriber corresponding to a special category. Thus, for instance, on the higher row of the matrix, which corresponds to the special subscriber of the first thousand group, three arrangements of cores are found, *to*1, *to*2, *to*3. On the cores *to*1, it is possible to read the subscriber's equipment (or unit) number; on cores *to*2, there is found the calling telephone number of this subscriber, that is to say his directory number; finally, on cores *to*3, there is brought the corresponding category indication. Thus under such conditions one can understand that it is possible to easily modify a subscriber's category; it is just necessary to erase the indication existing on the cores *to*3 so as to replace it by the required indication. This operation may be effected in a very simple way, from the main exchange, by well-known means, not illustrated in the figures. Such a matrix is of a quite reduced size, since the special subscribers are small in number. The subscribers are classified per thousand groups; inside each thousand group they are arranged in order of directory numbers.

The caller's telephone number, written in the left compartment of the memory MT3, is communicated to the code allotter DCT that chooses a scanner corresponding to the subscriber's thousand group. It will be assumed that this subscriber belongs to the first thousand group, and the scanner chosen is EXT1. Under the control of the code allotter DCT, EXT1 scans successively the various subscribers of the first thousand group. The indications read on the cores *to*2 by the equipment (or unit) NA are transmitted to the comparator CP (connection 17). This comparator receives, on the other hand, from memory MT3, the caller's telephone number (connection 28). When the indications received by the comparator CP on the connections 17 and 28 are identical, the comparator renders conducting an "AND" gate (connection 29); the category indication read on the cores *to*3 by the equipment CS is then transmitted to the right compartment of the memory MT3 (connection 18).

When the register is scanned by EXE (FIGURES 1 and 2), the special category indication is transferred from the memory MT3 onto the said register, after which, the memory releases. The register is then able to control the different operations which correspond to this category.

It is also possible to obtain the category indication of special subscriber by starting from his equipment number. In such a case, this number is written in the left compartment of the memory MT3 (FIGURE 4) in lieu of the directory number. With the help of means not shown in the figures, the equipment NA is substituted by the equipment NE, so that, during the scanning of the various rows, the cores *to*1 can be read out, and not the cores *to*2. When identity exists between the received codes and the comparator CP on the connections 17' and 28, the comparator renders conducting the "AND" gate (connection 29), the category indication found in front of the equipment number being then transmitted to the right compartment of the memory MT3. This second method is longer than the first one, in as much as the subscriber's thousand group is not known and that it is necessary to scan systematically all the rows; nevertheless, this is much more practical, at least in the case whereof a calling subscriber is concerned because the marker, after having effected the pre-selection, knows the number of the equipment and not the directory number. Any way, the amount of special subscribers is small and the total scanning duration of the rows is never really long.

Now will be described the case of a called subscriber of special category. When the register has received the called subscriber's telephone number and that it is scanned by EXE (FIGURES 1 and 2), it cannot know, offhand, whether this is or is not a special category subscriber. This item of information is however essential to the register, since the routing of the call depends on it. With this purpose in view, it communicates the received telephone number onto memory MT3 through the connection 13.

If the called subscriber corresponds to a special category, this category is determined in the same way as in the case of a calling subscriber. In the contrary case, the scanning of the rows in the translator TDS does not give, of course, any result, and it is not possible to write anything in the memory MT3. The register, having found nothing in this memory, deduces that this must be an ordinary subscriber.

Figure 6:
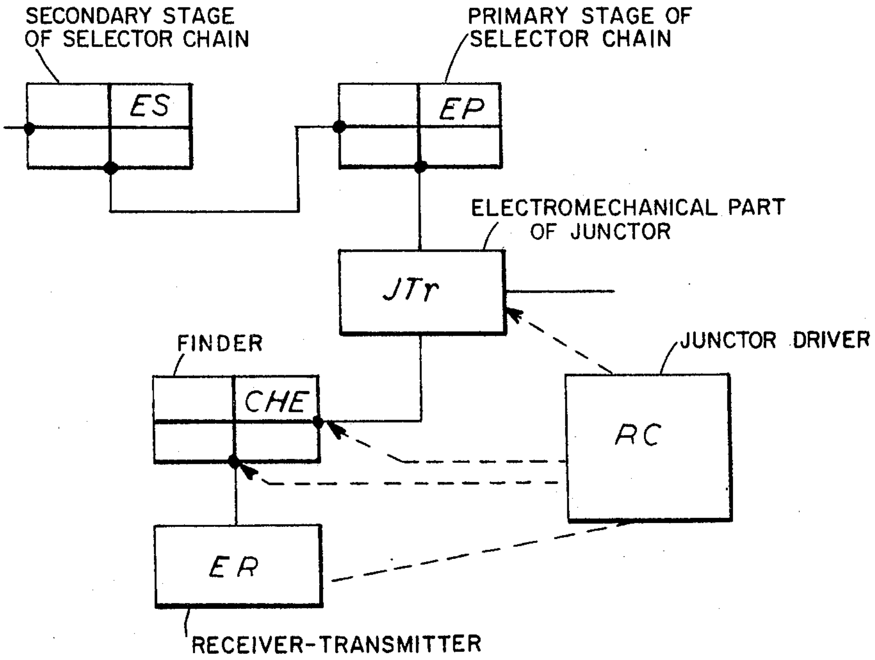
FIGURE 6 is a diagram for use in explaining how it is possible for an emitter-receiver common to several junctors, to assume various functions.

*Common receivers transmitters for junctors.*—As has been already mentioned, the electromechanical part JT*r* of the junctor is much simplified and reduces itself essentially to a few relays. It can still be simplified further by concentrating some functions in common units. Such is the case, for instance, of the sending of the dialling tone and the ringing current, which only necessitate a short duration-period as compared to the time of immobilisation of the junctor. These common units, designated as "receivers transmitters," have been shown by ER in FIGURE 6, and are accessible to the junctor JT*r* through finders CHE made up of multiswitch crossbars. It is possible, for instance, to provide a number of junctors, between 3 and 5, for each receiver transmitter. Thus, it is quite evident that the junctor driver RC must have access to the junctors JT*r*, to the finders CHE, and to the receivers transmitters ER. In EP and in ES are shown the primary stage and secondary stage of the selection chain.

It is understood that the foregoing descriptions have been given only by way of example, are non-limitative, and that numerous other embodiments may be conceived without exceeding the scope of the present invention. The ferrite cores could, for instance, be replaced by other memories, such as those that make use of ferro-electrical phenomena. Scanners of another type could be provided, and distribution of the functions among the transfer memories MT1 and MT2 in a different way is possible. Other time charts may be adopted etc. . . . In particular, the numerical indications were only given as an example in order to facilitate the understanding of the operating process, and they may be varied with each installation.

Improvements are shown to selection systems for circuits or electrical equipment offering the following advantages. Embodiments of this invention make it possible to dispense with the third wire that was previously provided to the selectors; provide memories for the translator which determine special service subscribers; and provide transfer memories to perform some of the junctor driver functions such as the interchange of information between the junctor logic circuit and the electromechanical communication circuit.

What is claimed is:

1. In an automatic telephone switching system for extending connections between calling and called lines through a plurality of switching stages interconnected by junctor means, each of said switching stages comprising two-wire transmission paths, control means operable responsive to directive signals from any said calling line for marking said calling line and any called line, means for operating said switching stages to complete a connection over said two-wire transmission path from the said calling line to said called line, holding means in said switching stages for maintaining said established connection independently of holding control, and release means responsive to the termination of said connection for controlling said holding means over said two-wire transmission path for releasing said switching stages.

2. In an automatic telephone switching system as set forth in claim 1, registering means in said control means for registering said directive signals, marking means in said control means operable responsive to a calling condition on said calling line for identifying the calling line and operable responsive to the said registering of directive signals for identifying the called line, and means controlled by said calling and called line identification for controlling the said release means.

3. An automatic telephone switching system as set forth in claim 2 wherein the said junctor means includes memory means for storing indications of said calling and called line identifications.

4. An automatic telephone switching system as set forth in claim 2 wherein said marking means includes means for selecting a path through said switching stages, wherein said junctor means includes memory means for receiving and storing data from said marking means indicative of the said selected path, and wherein said marking means controls said release means in accordance with said stored data.

5. In an automatic telephone switching system as set forth in claim 2, means for assigning certain of said lines as restricted service lines, memory means in said control means for recording the line identity and classification, translator means for displaying said line identity and determing said classification therefrom, comparator means for comparing said translated classification and said memory classification, and means for controlling said switching stages to complete a two-wire transmission path according to said classification comparison.

6. An automatic telephone switching system as set forth in claim 2 wherein said junctor means includes memory means serving said registering means and said marking means, and wherein scanning means is included in said control means to associate said registering means and said marking means with said memory means during different discrete time intervals.

7. An automatic telephone switching system as set forth in claim 6 wherein said scanning means includes means for allocating a plurality of time intervals for associating said registering means with said memory means, and wherein means is included in said scanning means for assigning an unused one of said time intervals allocated said registering means to said marking means.

8. An automatic telephone switching system as set forth in claim 1 wherein the said holding means comprises magnetic remanence locking devices and wherein said release means includes means for overcoming the magnetic remanence of said devices.

9. An automatic telephone switching system as set forth in claim 8 wherein said means for overcoming the magnetic remanence of said devices includes means for transmitting a de-magnetizing current over said two-wire transmission path to said devices.

No references cited.

KATHLEEN H. CLAFFY, *Primary Examiner.*

ROBERT H. ROSE, *Examiner.*

W. C. COOPER, *Assistant Examiner.*